(12) United States Patent
Larson

(10) Patent No.: US 7,016,858 B1
(45) Date of Patent: Mar. 21, 2006

(54) INTEGRATED SUPPLIER SECONDARY CHARACTERISTIC REPORTING METHOD

(75) Inventor: Stephen K Larson, Whitmore Lake, MI (US)

(73) Assignee: Ford Motor Company, Dearborn, MI (US)

( * ) Notice: Subject to any disclaimer, the term of this patent is extended or adjusted under 35 U.S.C. 154(b) by 560 days.

(21) Appl. No.: 09/562,205

(22) Filed: May 2, 2000

(51) Int. Cl.
*G06F 17/60* (2006.01)

(52) U.S. Cl. .......................................... 705/7

(58) Field of Classification Search .............. 705/7, 705/2, 10, 51; 702/81; 365/190; 700/86, 700/87, 95, 104, 115, 108, 214, 242, 88; 706/50, 925, 934; 707/10, 101, 102, 103 X, 707/503, 505, 513; 709/201, 206
See application file for complete search history.

(56) References Cited

U.S. PATENT DOCUMENTS

| | | | |
|---|---|---|---|
| 5,504,890 A * | 4/1996 | Sanford ....................... | 709/203 |
| 5,765,138 A * | 6/1998 | Aycock et al. ................ | 707/10 |
| 6,122,622 A * | 9/2000 | Wiitala et al. ............... | 264/400 |
| 6,327,594 B1 * | 12/2001 | Van Huben et al. ......... | 264/400 |
| 6,366,824 B1 * | 4/2002 | Nair et al. ................... | 455/3.01 |
| 6,385,644 B1 * | 5/2002 | Devine et al. ............... | 709/203 |
| 6,401,091 B1 * | 6/2002 | Butler et al. ................ | 706/934 |
| 6,408,163 B1 * | 6/2002 | Fik ............................. | 455/3.01 |

FOREIGN PATENT DOCUMENTS

EP 1126396 A2 * 8/2001

OTHER PUBLICATIONS

Wernle, B., Adopting Future Plans: Mentor Program Provides Expertise, Crain's Detroit Business, Crain Communications, Inc., Aug. 4, 1991, p. E3 [DIALOG: file 16].*
Gallop, G., The State of Small Black Business, Black Enterprise, vol. 29, No. 4, Nov. 1998, start p. 63 [DIALOG: file 141].*
Federal Acquisition Regulations (FAR), FAC 90-32, Part 19, Small Business Programs, Oct. 1, 1995, p. 19-24, and 19-35.*

* cited by examiner

*Primary Examiner*—Tariq R. Hafiz
*Assistant Examiner*—Michael C. Heck
(74) *Attorney, Agent, or Firm*—David B. Kelley; Tung & Associates

(57) ABSTRACT

Within a method for monitoring for a business a secondary characteristic of a supplier which supplies the business, there is first provided a reporting database resident within a computer. The reporting database has a minimum of one field coded for a secondary characteristic of a supplier which supplies a business. There is then entered into the reporting database within the minimum of one field coded for the secondary characteristic data directed towards the secondary characteristic. There is then generated from the data directed towards the secondary characteristic a report. Finally, there is then transmitted to the business which is supplied by the supplier the report. The method is particularly useful for monitoring and controlling sub-supplier secondary characteristics of a transportation vehicle manufacturing business.

23 Claims, 1 Drawing Sheet

INTEGRATED SUPPLIER SECONDARY CHARACTERISTIC REPORTING METHOD

BACKGROUND OF THE INVENTION

1. Field of the Invention

The present invention relates generally to business methods. More particularly, the present invention relates to multi-level supplier reporting methods within the context of business methods.

2. Description of the Related Art

Integral to operation of many businesses is the acquisition, through a plurality of suppliers, each of which does business with the business, of a series of goods and/or services which are either directly or indirectly incorporated into a product or service which is sold by the business. Within the context of particularly complex businesses, such as, for example, transportation vehicle manufacturing businesses, there is typically acquired through a plurality of suppliers a series of transportation vehicle components, transportation vehicle subassemblies, transportation vehicle fabrication tools and related expendable transportation vehicle assembly supplies and services, which are either directly or indirectly incorporated into a transportation vehicle which is sold by a transportation vehicle manufacturing business.

While businesses in general, and transportation vehicle manufacturing businesses in particular, clearly require a plurality of suppliers for efficient and effective operation, the monitoring and controlling of various aspects of the plurality of suppliers which supplies a business, and in particular a transportation vehicle manufacturing business, with various goods and services, is generally not without problems. In that regard, the monitoring and controlling of a plurality of suppliers which supplies a business, such as but not limited to a transportation vehicle manufacturing business, while generally practical within the context of the characteristics which are integral to (i.e., intrinsic to or primary to) specific goods or services which are directly supplied by the supplier to the business, typically nonetheless also presents practicality problems and additional administrative burden with respect to characteristics which are not integral to (i.e., extrinsic to or secondary to) the specific goods or services which are directly supplied by the supplier to the business. For example and without limitation, characteristics which are not integral to the specific goods or services which are directly supplied by the supplier to the business may include, but are not limited to: (1) environmental compliance characteristics of the supplier; and (2) sub-supplier characteristics of the supplier, such as but not limited to minority sub-supplier characteristics of the supplier and geographic sub-supplier characteristics of the supplier.

In turn, secondary characteristics of a supplier are often important within business relationships between a business and a supplier, since secondary characteristics are often subject to government mandated entitlement programs and preference programs.

There thus exists within businesses in general, and transportation manufacturing businesses in particular, a need to monitor and control secondary characteristics of a supplier which does business with a business.

It is towards the foregoing object that the present invention is directed.

SUMMARY OF THE INVENTION

In accord with the object towards which the present invention is directed, there is provided by the present invention a method for monitoring for a business a secondary characteristic of a supplier which supplies the business.

To practice the method of the present invention, there is first provided a reporting database resident within a computer, where the reporting database has a minimum of one field coded for a secondary characteristic of a supplier which supplies a business. There is then entered into the reporting database within the minimum of one field coded for the secondary characteristic data directed towards the secondary characteristic. There is then generated from the data directed towards the secondary characteristic a report. Finally, there is then transmitted to the business which is supplied by the supplier the report.

BRIEF DESCRIPTION OF THE DRAWING

The object, features and advantages of the present invention are understood within the context of the Description of the Preferred Embodiment, as set forth below. The Description of the Preferred Embodiment is understood within the context of the accompanying drawing, which forms a material part of this disclosure, wherein.

DESCRIPTION OF THE PREFERRED EMBODIMENT

Figure 1:
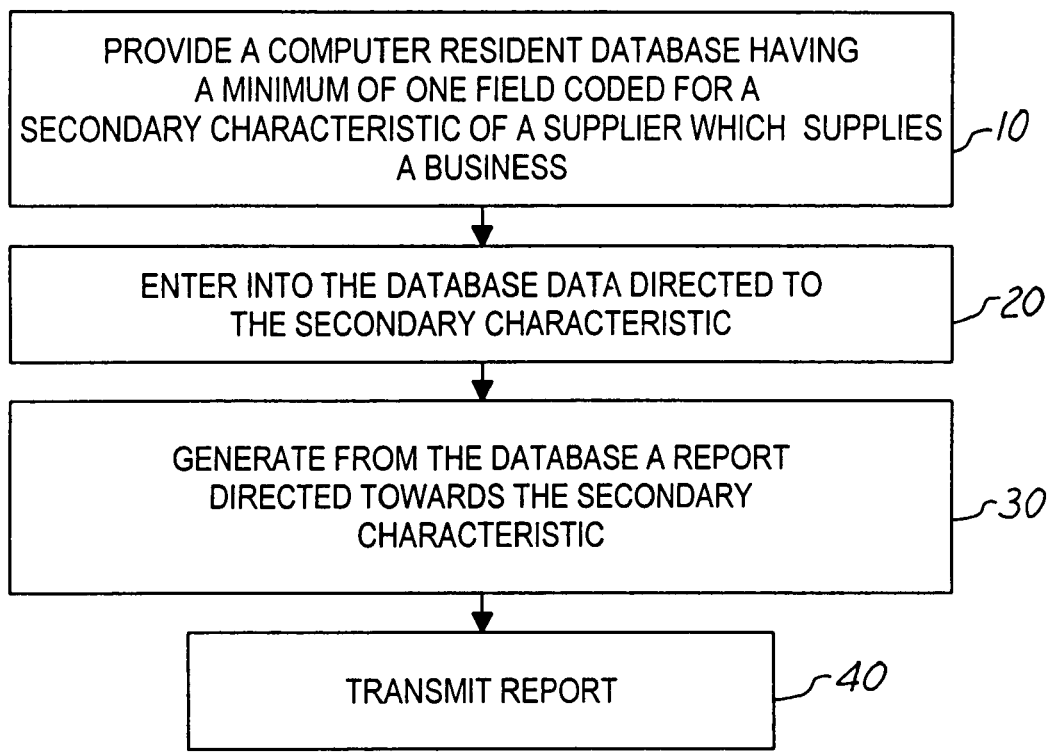
FIG. 1 shows a schematic process flow diagram illustrating a series of process steps in accord with the present invention.

The present invention provides a method for monitoring for a business a secondary characteristic of a supplier which supplies the business. Although the preferred embodiment of the present invention is directed towards a transportation vehicle manufacturer as a business which is supplied by a supplier which supplies transportation vehicle components, subassemblies and/or services to the transportation vehicle manufacturer, and where in turn the supplier is supplied by a sub-supplier which supplies transportation vehicle sub-components, sub-subassemblies and/or sub-services to the supplier, the method of the present invention is not exclusively limited to transportation vehicle manufacturing businesses in specific, or manufacturing business in general. Rather, the method of the present invention may be employed within the context of any permutation wherein: (1) the business is selected from the group consisting of manufacturing businesses, services business and hybrid manufacturing and services businesses; (2) the supplier is selected from the group consisting of manufacturing suppliers, services suppliers and hybrid manufacturing and services suppliers; and (3) the sub-supplier is selected from the group consisting of manufacturing sub-suppliers, services sub-suppliers and manufacturing and services sub-suppliers.

Referring now to FIG. 1, there is shown a schematic process flow diagram illustrating a series of process steps in accord with the method of the present invention. In particular, there is illustrated within FIG. 1, in conjunction with reference numeral 10, the first process step in accord with the method of the present invention. In accord with the process step which corresponds with reference numeral 10, there is first provided within the present invention a computer resident database having a minimum of one field which is coded for a secondary characteristic of a supplier which supplies a business.

Within the preferred embodiment of the present invention with respect to the computer resident database, the computer resident database may be selected from the group consisting of computer resident data collection and retrieval databases, as well as computer resident spreadsheet databases. Similarly, within the present invention and the preferred embodiment of the present invention, the computer resident database is typically and preferably selected from a group of commercially available computer resident data collection and retrieval databases and computer resident spreadsheet databases, although it is also feasible and under certain circumstances preferred within the preferred embodiment of the present invention that there may be employed within the present invention a custom computer resident database or a customized commercially available computer resident database, for use within the method of the present invention. Within the present invention and the preferred embodiment of the present invention, the computer resident database may be maintained by the business, the supplier or some other independent entity.

Within the preferred embodiment of the present invention with respect to the secondary characteristic of the supplier which does business with the business, the secondary characteristic may be selected from the group of secondary characteristics including but not limited to: (1) environmental compliance secondary characteristics of the supplier; and (2) sub-supplier secondary characteristics of the supplier, such sub-supplier secondary characteristics including but not limited to minority sub-supplier secondary characteristics of the supplier and geographic sub-supplier secondary characteristics of the supplier (i.e., quantity and type of non-domestic sub-suppliers with which a supplier does business).

Referring again to FIG. 1, there is illustrated in conjunction with reference numeral 20 the next process step in accord with the method of the present invention. In accord with the process step which corresponds with reference numeral 20, there is entered into the database data directed towards the secondary characteristic of the supplier.

Within the preferred embodiment of the present invention wherein the supplier is a manufacturing supplier and the business is a transportation vehicle manufacturing business, there will typically and preferably be entered within the computer resident database data directed towards secondary characteristics such as a quantity of minority sub-supplier business which the supplier does with (i.e., transacts with) minority sub-suppliers which supply the supplier. Such minority sub-supplier business is effectively passed through to the business within goods or services which are sold to the business by the supplier. For purposes of convenience, it is also plausible within the context of the present invention that the computer resident database may in a first instance be pre-programmed with a menu of specifically certified minority sub-suppliers with which a supplier might do business.

Thus, within a typical and preferable entry of data directed towards secondary characteristics into the computer resident database, there will typically and preferably, but not exclusively, be entered into the computer resident database data such as but not limited to supplier name, total supplier business, supplier to business quantity of business, aggregate sub-supplier to supplier business, listing of minority sub-suppliers to supplier, geographic listing of sub-suppliers to supplier, listing of minority sub-supplier business with supplier, geographic listing of off-shore sub-supplier business with supplier, listing of sub-supplier business which is passed through the supplier to a business, supplier contact information, sub-supplier contact information and related information, such as purchasing forecasts. Similarly, the database may also have incorporated therein supplier performance standards against which measured or calculated supplier performance may be compared for self assessment purposes.

From a practical perspective and within the context of the present invention, the supplier is in an optimal position to have all requisite information which needs to be entered into the computer resident database, thus, typically and preferably the supplier, or another party under the supplier's direction, will enter into the computer resident database data as directed towards the secondary characteristics and in particular the sub-supplier secondary characteristics of the supplier.

Referring again to FIG. 1, there is illustrated in conjunction with reference numeral 30 the next process step in accord with the method of the present invention. In accord with the process step which corresponds with reference numeral 30, there is generated from the database a report directed towards the secondary characteristic.

Within the present invention and the preferred embodiment of the present invention, the report may be a standard report as is pre-determined when initially providing and programming the computer having resident therein the computer resident database, or in the alternative, the report may be customized with respect to a particular business to which the supplier is to transmit the report. Similarly, such customization may be assisted while employing any of several software analytical tools, such as but not limited to menu driven software analytical tools, as are known in the art of computer resident database design and operation. Yet similarly, as above, although data is entered into the computer resident database typically and preferably by the supplier, a report generated from the data entered into the computer resident database may be generated by the supplier, the business or any other party who is provided with proper access to the database.

Referring finally to FIG. 1, there is illustrated in conjunction with reference numeral 40 the next process step in accord with the method of the present invention. In accord with the process step which corresponds with reference numeral 40, there is then transmitted the report.

Although not specifically illustrated within the schematic process flow diagram of FIG. 1, the report will typically and preferably be transmitted to the business which is supplied by the supplier.

Similarly, although not specifically illustrated within the schematic process flow diagram of FIG. 1, and under circumstances wherein the report is either: (1) a generalized report which is requested by a multiplicity of businesses which the supplier supplies; or (2) a readily customizable report which may be readily customized to serve each business within the multiplicity of businesses which the supplier supplies, it is also feasible and preferred within the preferred embodiment of the present invention that the report be either simultaneously or sequentially transmitted to the multiplicity of businesses, in either a generalized form or a customized form, as appropriate. Similarly, and also as a related option, where the report is of a variety which is subject to government reporting, the report may similarly also be transmitted to an appropriate government agency.

Further, and although also not specifically illustrated within the schematic process flow diagram of FIG. 1, in order to facilitate simultaneous or sequential transmission of the report to a plurality of businesses, government agencies and/or other recipients, the present invention also contemplates, and is preferably executed within the context of, a distributed communication network, such as but not limited to an Internet distributed communication network, and Intra-business Intranet distributed communications network or an Inter-business Intranet distributed communications network, to which a computer within which the computer resident database may be readily connected, such that the report or reports may readily be transmitted.

As is understood by a person skilled in the art, and as is noted above, the preferred embodiment of the present invention is illustrative of the present invention rather than limiting of the present invention. Revisions and modifications may be made to a business environment, hardware requirements, software requirements and reporting requirements through which is practiced the preferred embodiment of the present invention, while still providing a method in accord with the present invention, further in accord with the appended claims.

What is claimed is:

1. A method for monitoring for a business a secondary characteristic of a supplier which supplies the business comprising:

providing a reporting database resident within a computer maintained by a business supplied by a supplier, the reporting database having a minimum of one field coded for a secondary characteristic of the supplier which is not directly accessible to the business;

entering, by the supplier or a party under the supplier's direction, into the reporting database within the minimum of one field coded for the secondary characteristic data directed towards the secondary characteristic;

generating from the data directed towards the secondary characteristic a report; and transmitting to the business which is supplied by the supplier the report.

2. The method of claim 1 wherein the business is selected from the group consisting of manufacturing businesses, services businesses and hybrid manufacturing and services businesses.

3. The method of claim 1 wherein the supplier is selected from the group consisting of manufacturing suppliers, services suppliers and hybrid manufacturing and services suppliers.

4. The method of claim 1 wherein the report is simultaneously transmitted to a second business when the report is transmitted to the business.

5. The method of claim 1 wherein the secondary characteristic is selected from the group consisting of environmental compliance characteristics, minority sub-supplier characteristics and geographic sub-supplier characteristics.

6. The method of claim 1 wherein the report is transmitted to the business while employing a distributed communication network.

7. The method of claim 1 wherein the data directed towards the secondary characteristic is entered into the reporting database by the supplier.

8. The method of claim 1 wherein the data directed towards the secondary characteristic is entered into the reporting database by the party under the supplier's direction.

9. The method of claim 1 wherein the report is generated by the business.

10. The method of claim 1 wherein the report is generated by the supplier.

11. The method of claim 1 wherein the report is generated by a party other than the business and the supplier.

12. The method of claim 1 wherein the report is transmitted by the supplier.

13. A method for monitoring for a transportation vehicle manufacturing business a secondary characteristic of a supplier which supplies the transportation vehicle manufacturing business comprising:

providing a reporting database resident within a computer maintained by a transportation vehicle manufacturing business supplied by a supplier, the reporting database having a minimum of one field coded for a secondary characteristic of the supplier which is not directly accessible to the transportation vehicle manufacturing business;

entering, by the supplier or a party under the supplier's direction, into the reporting database within the minimum of one field coded for the secondary characteristic data directed towards the secondary characteristic;

generating from the data directed towards the secondary characteristic a report; and transmitting to the transportation vehicle manufacturing business which is supplied by the supplier the report.

14. The method of claim 13 wherein the supplier is selected from the group consisting of manufacturing suppliers, services suppliers and hybrid manufacturing and services suppliers.

15. The method of claim 13 wherein the report is simultaneously transmitted to a second business when the report is transmitted to the transportation vehicle manufacturing business.

16. The method of claim 13 wherein the secondary characteristic is selected from the group consisting of environmental compliance characteristics, minority sub-supplier characteristics and geographic sub-supplier characteristics.

17. The method of claim 13 wherein the report is transmitted to the transportation vehicle manufacturing business while employing a distributed communication network.

18. The method of claim 13 wherein the data directed towards the secondary characteristic is entered into the reporting database by the supplier.

19. The method of claim 13 wherein the data directed towards the secondary characteristic is entered into the reporting database by the party under the supplier's direction.

20. The method of claim 13 wherein the report is generated by the business.

21. The method of claim 13 wherein the report is generated by the supplier.

22. The method of claim 13 wherein the report is generated by a party other than the business and the supplier.

23. The method of claim 13 wherein the report is transmitted by the supplier.

* * * * *